(12) United States Patent
Albero et al.

(10) Patent No.: US 11,983,710 B2
(45) Date of Patent: May 14, 2024

(54) HASH-BASED TRANSACTION TAGGING

(71) Applicant: Bank of America Corporation, Charlotte, NC (US)

(72) Inventors: George Albero, Charlotte, NC (US); William August Stahlhut, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 45 days.

(21) Appl. No.: 17/860,204

(22) Filed: Jul. 8, 2022

(65) Prior Publication Data

US 2024/0013208 A1     Jan. 11, 2024

(51) Int. Cl.
*G06Q 20/38*     (2012.01)
*G06Q 20/02*     (2012.01)
*G06Q 20/40*     (2012.01)

(52) U.S. Cl.
CPC ........... *G06Q 20/389* (2013.01); *G06Q 20/02* (2013.01); *G06Q 20/401* (2013.01)

(58) Field of Classification Search
CPC .................................................. G06Q 20/389
See application file for complete search history.

(56) References Cited

PUBLICATIONS

Liang, Pierre Jinghong, et al. "Pattern Recognition and Anomaly Detection in Bookkeeping Data." Asian Bureau of Finance and Economic Research Working Papers (2021). (Year: 2021).*

* cited by examiner

*Primary Examiner* — Olabode Akintola
*Assistant Examiner* — Brandon M Duck
(74) *Attorney, Agent, or Firm* — Weiss & Arons LLP

(57) ABSTRACT

Apparatus and methods for determining transaction transmission fidelity are provided. A sender may receive a transaction log including multiple transactions in two or more rows and two or more columns. The transaction log may be encrypted. Each of the transactions may be tagged. Each row and column of the transaction log may be hashed. The encrypted transaction log and the hash values may be transmitted to a recipient. The recipient may decrypt the transaction log and hash each row and column of the decrypted transaction log. The hash values may be compared and if there is a difference, a report or alert may be generated.

18 Claims, 6 Drawing Sheets

HASH-BASED TRANSACTION TAGGING

FIELD OF TECHNOLOGY

Aspects of the disclosure relate to providing apparatus and methods for tagging transactions in transit, hashing the transactions, and identifying mismatches.

BACKGROUND OF THE DISCLOSURE

Consumers and entities may transmit multiple transactions in single batches. For example, a financial institution may have a branch in Los Angeles, CA that processes 10,000 transactions every day. The transactions may be transmitted across the financial institution's network (or another network) in batches of 500, 1000, or any number, to multiple destinations (in parallel or series).

Each batch transmission may take the form of a transaction log with data organized in various formats. One format may be multiple rows and columns (e.g., payee, payor, account number, date, time, amount, etc.), and each transaction may occupy one or more rows with data in some or all of the columns. Various other formats may be used. The transmission of multiple transactions in one large file may save transmission costs and provide other benefits.

However, if the batch transmission is attacked by a malicious actor, or there is a mistake, or the file becomes corrupted, it may be difficult to determine which particular transaction's data has been changed or corrupted.

Tagging each transaction with a unique identifier (which may be a hash) may allow the consumer or entity to track each transaction within the batch transmission more easily.

Hashing the data within the batch transmission may save storage and processing power when comparing the hashes to determine which transaction's data has been changed or corrupted when compared to checking each transaction's data separately.

Therefore, it would be desirable for apparatus and methods for tagging transaction transmissions, hashing the transmissions, and identifying mismatches to ensure fidelity of the transactions.

SUMMARY OF THE DISCLOSURE

It is an object of this disclosure to provide apparatus and methods for tagging transaction transmissions, hashing the transmissions, and identifying mismatches to ensure fidelity of the transactions.

A transaction tagging computer program product is provided. The computer program product may include executable instructions. The executable instructions may be executed by a processor on a computer system.

The program may receive, from a sender, a first transaction log. The first transaction log may include first data. The first data may include information relating to two or more transactions. The data may be structured in two or more rows and two or more columns, or in any other suitable format. Each transaction may include the information on each row (i.e., one row is equal to one transaction) or column. Each transaction may be formatted in a different format.

The program may generate one or more first hash values corresponding to each row and column of the two or more rows and two or more columns. The hash values may be generated using any suitable hashing algorithm. The more secure and robust the hashing algorithm, the more secure and robust the program may be. That is, for example, in a log with three columns and three rows, there will be six hash values, one for each column and one for each row. This may save memory and processing power as opposed to calculating a hash value for each cell (which in a 3×3 log would be nine cells).

The program may tag each of the two or more transactions with a unique identifier. In an embodiment, the unique identifier may be a hash value. For example, each transaction may occupy one row in the transaction log. The unique identifier may be a hash value of that entire row.

The program may encrypt the first transaction log and transmit the encrypted first transaction log to a recipient. The recipient may be a server or other computer system.

The program may decrypt the transmitted first transaction log at the recipient to create a second transaction log. The second transaction log may be the decrypted version of the transmitted first transaction log. The second transaction log may include second data in two or more rows and two or more columns. The second data may include information relating to two or more transactions. The data may be structured in two or more rows and two or more columns, or in any other suitable format.

The program may generate, at the recipient, one or more second hash values corresponding to each row and column of the two or more rows and two or more columns in the second transaction log.

The program may transmit the first hash values to the recipient. The program may compare the first hash values to the second hash values. When the hash values match, the program may do nothing. In an embodiment, when the hash values match, the program may generate a report stating the values match and/or include other suitable information.

When one or more of the first hash values do not match and are different from any of the corresponding second hash values, the program may perform one or more actions. The program may automatically identify which row and which column include different data in the second transaction log compared to the corresponding row and column in the first transaction log. The program may generate a report identifying the different data and the unique identifier corresponding to the different data. And the program may transmit the report to the sender.

In an embodiment, the program may include instructions to transmit the second transaction log to a second recipient. This may continue for "n" recipients.

In an embodiment, the first hash values and second hash values may be encrypted along with the first transaction log and second transaction log.

In an embodiment, the program may include tagging the first transaction log with the one or more first hash values to create a first tagged transaction log. In an embodiment, the program may include tagging the second transaction log with the one or more second hash values to create a second tagged transaction log.

In an embodiment, the program may include comparing the first tagged transaction log with the second tagged transaction log.

In an embodiment, the program may include instructions to transmit the report to a security entity. The security entity may be a separate computer program, such as an anti-malware program. The security entity may be a person. The person may have administrative responsibilities and privileges.

In an embodiment, the program may include instructions to repair the second transaction log with the first data to create a repaired second transaction log and transmit the repaired second transaction log to the sender and a second recipient. The repaired second transaction log may be identical to the first transaction log. The repaired second transaction log may be identical to the first transaction log, except with respect to metadata. The metadata may identify the repaired second transaction log as the repaired second transaction log instead of the first transaction log.

In an embodiment, the first transaction log may include metadata. In an embodiment, the second transaction log may include metadata. The metadata may include information such as the IP address of the sender and recipient, time and date of transmission(s), author data, program data, time, date and location of when and where the transaction log was created, as well as other information.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
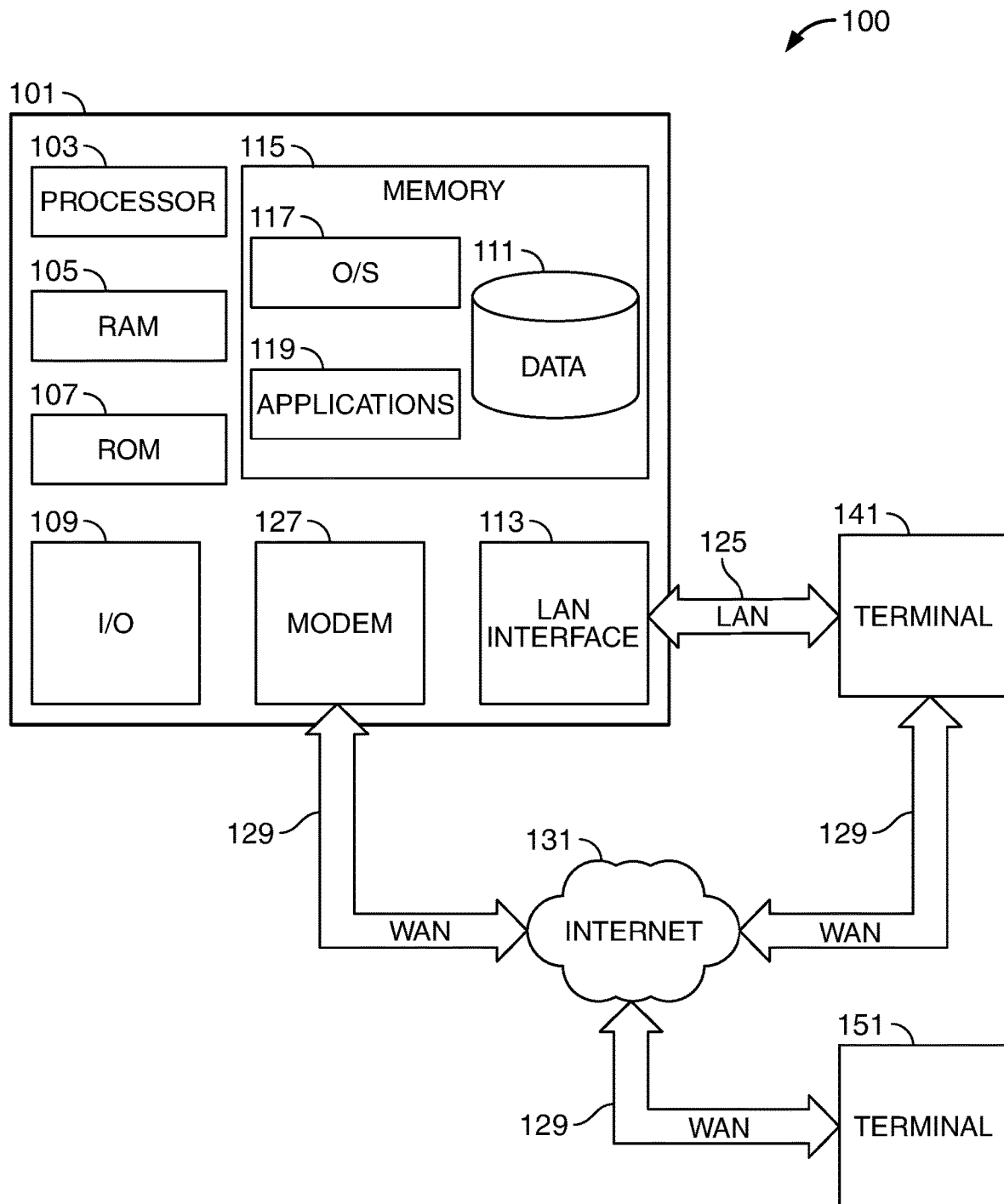
FIG. 1 shows an illustrative apparatus in accordance with principles of the disclosure.

It is an object of this disclosure to provide apparatus and methods for tagging transaction transmissions, hashing the transmissions, and identifying mismatches. The mismatches may be used to ensure fidelity of the transactions.

A transaction tagging computer program product is provided. The computer program product may include executable instructions. The executable instructions may be executed by a processor on a computer system. Multiple processors may increase the speed and capability of the program. The executable instructions may be stored in non-transitory memory on the computer system or a remote computer system, such as a server. Other standard components of a computer system may be present.

The computer system may be a server, mobile device, or other type of computer system. A server or more powerful computer may increase the speed at which the computer program may run. Portable computing devices, such as a smartphone, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer system may be a server. The computer system may be run on a smart mobile device. The computer program, or portions of the computer program may be linked to other computers or servers running the computer program. The server or servers may be centralized or distributed. Centralized servers may be more powerful and secure than distributed servers but may also be more expensive.

The program (i.e., the executable instructions that comprise the program) may be configured to receive, from a sender, a first transaction log. The sender may be a user (person or entity) or a computer. The sender may be located at the same computer system as the computer program product. The sender may be located at a different computer system than the computer program product. The first transaction log may be transmitted to the computer program product or input directly into the computer program product.

The first transaction log may include first data. The first data may include information relating to two or more transactions. The first transaction log may be a spreadsheet or another format. The data may be structured in two or more rows and two or more columns, or in any other suitable format. When the data is in a spreadsheet, the spreadsheet may include a number of cells equivalent to the number of rows multiplied by the number of columns (i.e., a 5 by 7 spreadsheet will have 35 cells).

Each transaction may include the information on each row (i.e., one row is equal to one transaction) or column. Each transaction may be formatted in a different suitable format. Each sender (whether an entity or person) may have their own unique procedure on formatting transactions.

The program may generate one or more first hash values corresponding to each row and column of the two or more rows and two or more columns. That is, for example, in a log with ten columns and ten rows, there will be 20 hash values, one for each column and one for each row. This may save memory and processing power as opposed to calculating a hash value for each cell (which in a 10×10 log would be 100 cells; this procedure may generate 20 hash values instead of 100).

In another embodiment, if there is only one column, but X amount of rows, there may be X+1 hash values. The one column hash value may be the hash value of all of the data in all of the rows. In this embodiment, a different column hash value between the first set of hash values and the second set of hash values may indicate that something in the log has been corrupted or changed, but may not be able to provide a pinpoint to any particular changed value.

In an embodiment, each transaction may be a row, but there may be no distinct columns. In this embodiment, each transaction (row) may have its own unique hash value and each comparison will not be row by and column by column, but only row by row. This may provide less detailed information on what, if any value has been corrupted or changed, but will allow the program to pinpoint which transaction (as a whole) has been corrupted or changed.

The hash values may be generated using any suitable hashing algorithm. The more secure and robust the hashing algorithm, the more secure and robust the program may be. However, the more robust the hashing algorithm, the more processing power and time may be needed by the program to generate the hashes. The hashing algorithm may be kept secure from malicious activity. If a malicious actor recreates the hashing algorithm, the malicious actor may be able to circumvent the computer program product.

The program may tag each of the two or more transactions with a unique identifier. The tag may help with record keeping and reconstructing any incident if a transaction is altered or corrupted. In an embodiment, the unique identifier may be a hash value. For example, each transaction may occupy one row in the transaction log. The unique identifier may be a hash value of that entire row.

In an embodiment, the unique identifier may be one of the hash values already calculated by the program. In an embodiment, the tags may appear in metadata of the transaction log. In an embodiment, the tags may appear within the body of the transaction log.

The program may encrypt the first transaction log and transmit the encrypted first transaction log to a recipient. Encryption may help secure the log from malicious activity. Any suitable encryption method or protocol may be used. The recipient may be a server or other computer system.

The transmission may be over the Internet, through a cellular connection, bluetooth, wi-fi, a local area network, or any other suitable communication protocol.

A copy of the program may be located at the recipient. The program may decrypt the transmitted first transaction log at the recipient to create a second transaction log. Ideally, if the transmission of the first log has not been corrupted or intercepted (by a malicious actor), the second transaction log should match the first transaction log. The second transaction log may be the decrypted version of the transmitted first transaction log.

The second transaction log may include second data in two or more rows and two or more columns. The second data may be the same as the first data. The second data may include information relating to two or more transactions. The data may be structured in two or more rows and two or more columns, or in any other suitable format.

The program may generate, at the recipient, one or more second hash values corresponding to each row and column of the two or more rows and two or more columns in the second transaction log. The hashing algorithm should be the same hashing algorithm as used by the program to generate the first hash values. Using a different hashing algorithm may generate ineffectual hash values that may have zero value to the program or any user.

The program may transmit the first hash values to the recipient. The transmission of the hash values may be at the same time as the transmission of the encrypted transaction log. The transmission of the hash values may be before or after the transmission of the encrypted transaction log. Transmitting the hash values separately may increase security, as a malicious actor would have to intercept both transmissions to perform malicious activity.

In an embodiment, the hash values may be transmitted both with the encrypted transaction log and in a separate transmission. In an embodiment, when the unique identifier tags are the hash values, transmission of the unique identifier tags (with or separately from the encrypted transaction log) may substitute as the transmission of the hash values.

The program may compare the first hash values to the second hash values. The program may utilize any suitable comparison algorithm to perform the comparison. In an embodiment, one or more artificial intelligence/machine learning algorithms may be used to perform the comparison. When the hash values match, the program may do nothing, or it may report that the values match and the second data is the same as the first data. In an embodiment, when the hash values match, the program may generate a report stating the values match and/or include other suitable information. The report may be transmitted to the sender and/or the recipient.

When one or more of the first hash values do not match and are different from any of the corresponding second hash values, the program may perform one or more actions. Not matching may imply that the second data has been corrupted, there was an error in transmission, or that a malicious actor intercepted the transmission of the transaction log and was able to adjust one or more pieces of data.

The program may automatically identify which row and which column include different data in the second transaction log compared to the corresponding row and column in the first transaction log. This identification may utilize any suitable algorithm, including an artificial intelligence/machine learning algorithm. The identification may be performed by determining which two (or more) second hash values are different from the corresponding first hash values. If data in a cell has been corrupted or changed, the hash values for the row and column of the cell should both be different. By identifying both different hash values the different cell(s) may be easily determined. For example, if only the cell in the fifth column and fifth row has different data (in e.g., a 10×10 spreadsheet), the fifth-row hash value and fifth column hash values only should have different values.

The program may generate a report identifying the different data and the unique identifier corresponding to the different data. Further information may be included in the report, such as a time and date, identities of the sender and recipient, IP addresses, other metadata, and other data. And the program may transmit the report to the sender, recipient, and/or to another location.

In an embodiment, the program may include instructions to transmit the second transaction log to a second recipient. This may continue for "n" recipients. For example, if a financial institution desires to send a transaction log from one branch to a superior branch, and then to corporate headquarters, the transaction log may be transmitted from location to location. When this invention is used for the transmission, the fidelity of the data may be assured, as well as giving the financial institution the ability to trace and track where the data was corrupted or changed, if necessary.

In an embodiment, the first hash values and second hash values may be encrypted along with the first transaction log and second transaction log. Encrypting the hash values may increase security.

In an embodiment, the program may include tagging the first transaction log with the one or more first hash values to create a first tagged transaction log. In an embodiment, the program may include tagging the second transaction log with the one or more second hash values to create a second tagged transaction log. A tagged transaction log may be encrypted and transmitted instead of and in place of the non-tagged transaction log. Tagging may increase the ability of a user or entity to trace when and where a transaction was corrupted or changed.

In an embodiment, the program may include comparing the first tagged transaction log with the second tagged transaction log, after each has been hashed according to this disclosure. The comparison may be similar to the comparison of the first hash values and second hash values.

In an embodiment, the program may include instructions to transmit the report to a security entity or other third-party. The security entity may be a separate computer program, such as an anti-malware program. The security entity may be a person. The person may have administrative responsibilities and privileges. The third-party may have administrative responsibilities and privileges. Transmitting the report may allow a user or entity to trace when and where any of the data within the transaction log has been corrupted or altered.

In an embodiment, the program may include instructions to repair the second transaction log with the first data to create a repaired second transaction log and transmit the repaired second transaction log to the sender and a second recipient. The repair may be as simple as replacing the corrupted or altered data (which has already been identified)

with the correct data from the first transaction log. The program may need to request the sender send that particular data or datum again. A different transmission protocol may be used to prevent the corruption or alteration of the data that needs to be repaired. Any suitable repair algorithm may be used.

The repaired second transaction log may be similar to or identical to the first transaction log. At the minimum, the data in the repaired second transaction log should be identical to the first data. In an embodiment, the repaired second transaction log may be identical to the first transaction log, except with respect to metadata. The metadata may identify the repaired second transaction log as the repaired second transaction log instead of the first transaction log.

In an embodiment, the first transaction log may include metadata. In an embodiment, every transaction log may include metadata. The metadata may include information such as the IP address of the sender and recipient, time and date of transmission(s), author data, program data, time, date, and location of when and where the transaction log was created, as well as other information. In an embodiment, the metadata may include the tags for each transaction.

A method for detecting transaction transmission fidelity is provided. The method may include steps labeled a) through i), as well as additional steps. Step a) may include receiving at a first computer, from a sender, a first transaction log. The first transaction log may include first data in two or more rows and two or more columns.

Step b) may include generating, at the first computer, one or more first hash values corresponding to each row and column of the two or more rows and two or more columns. For example, if the transaction log includes 5 rows and 3 columns, there may be 8 hash values generated, one for each row and one for each column. Any appropriate hashing algorithm may be utilized.

Step c) may include encrypting, at the first computer, the first transaction log. Step d) may include transmitting, from the first computer, the encrypted first transaction log to a recipient. The recipient may be another computer or server. The transmission may take place over an internal network, or an external network such as the Internet.

Step e) may include decrypting the transmitted first transaction log at the recipient and creating a second transaction log. The second transaction log may include second data in two or more rows and two or more columns. The second data may or may not match the first data. The second data may match the first data if the first data was not corrupted, intercepted, changed, etc. between the first computer and the recipient. One object of this disclosure is to determine if the second data matches the first data, as well as repairing any errors.

Step f) may include generating, at the recipient, one or more second hash values corresponding to each row and column of the two or more rows and two or more columns in the second transaction log, in the same manner as the first hash values.

Step g) may include transmitting, from the first computer, the one or more first hash values to the recipient. The first hash values may be transmitted at the same time as the first transaction log, or at a different time.

Step h) may include comparing, at the recipient (or in another embodiment, at the first computer or a second recipient), the one or more first hash values to the one or more second hash values. The comparison may simply compare the actual values or may take the form of any other suitable comparison algorithms.

At step i), when any of the first hash values are different than any of the corresponding second hash values, the method may include automatically identifying which row and which column includes different data in the second transaction log compared to the corresponding row and column in the first transaction log. For example, in a transaction log with 30 rows and 20 columns, if the $10^{th}$ row hash value is different, along with the $10^{th}$ column hash value, that means cell (row 10, column 10) is different in the second transaction log compared to the first transaction log.

Step i) may also include generating a report identifying the different data, by value, by cell location, or otherwise, and transmitting the report to the sender. The report may also be transmitted to other locations. In an embodiment, the report may be transmitted to a computer running a security protocol or other network administrator.

In an embodiment, all or some of the steps, especially steps d) through i) may be repeated for additional recipients. For example, the transaction log may be sent from computer/server to computer/server in a chain. At each link in the chain, the method may be repeated. This may help determine when and where data is changed or corrupted as the transaction log is transmitted from location to location.

In an embodiment, step i) may also include repairing the second transaction log with the first data to create a repaired second transaction log and transmitting the repaired second transaction log to the sender and a second recipient.

In an embodiment, the first transaction log may include first metadata. In an embodiment, the second transaction log may include second metadata.

In an embodiment, step i) may include analyzing the different data, the first metadata, and the second metadata. The analysis may be performed with one or more machine learning algorithms to determine whether the different data is the result of data corruption, malicious activity, user mistake, a combination of 1)-3), or some other source.

An apparatus for detecting transaction transmission fidelity is provided. The apparatus may include a sender computer and a recipient computer. Either one or both may be a server. The server may be centralized or decentralized.

The sender computer may include a sender communication link, a sender processor, and a sender non-transitory memory, among other components. The non-transitory memory may be configured to store executable data configured to run on the sender processor. The executable data may include a sender operating system and a sender copy of a transaction transmission fidelity program.

The recipient computer may include a recipient communication link, a recipient processor, and a recipient non-transitory memory configured to store executable data configured to run on the recipient processor. The executable data may include a recipient operating system and a recipient copy of the transaction transmission fidelity program.

The sender computer may receive a first transaction log which may include two or more transactions in two or more rows and two or more columns. The sender copy of the transaction transmission fidelity program may tag each of the two or more transactions with a unique identifier. The sender copy may generate one or more first hash values corresponding to each row and column of the two or more rows and two or more columns. The sender copy may encrypt the first transaction log. The sender copy may: transmit the first hash values to the recipient computer, transmit the unique identifiers to the recipient computer, and transmit the encrypted first transaction log to the recipient computer.

The recipient copy of the transaction transmission fidelity program may receive the first hash values, the unique identifiers, and the encrypted first transaction log from the sender computer. The recipient copy may decrypt the transmitted first transaction log to create a second transaction log which may include second data in two or more rows and two or more columns. The recipient copy may generate one or more second hash values corresponding to each row and column of the two or more rows and two or more columns in the second transaction log. The recipient copy may compare the first hash values to the second hash values.

When one or more of the first hash values are different from any of the corresponding second hash values, the recipient copy may automatically identify which row and which column includes different data in the second transaction log compared to the corresponding row and column in the first transaction log. The recipient copy may identify, through the unique identifiers, which transaction is different in the second transaction log, generate a report identifying the different data and different transaction, and transmit the report to the sender computer.

In an embodiment, the report may also be transmitted to a third party. The third party may be a security protocol or network administrator, or another administrator.

A processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with the recipient computer or sender computer as well as any server or servers. The communication link may include any necessary hardware (e.g., antennae) and software to control the link. Any appropriate communication link may be used. In an embodiment, the network used may be the Internet. In another embodiment, the network may be an internal intranet.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or a human, such as a sender or recipient.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as a transaction tagging program, hashing module, and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a transaction tagging program, hashing module, and security protocols) along with any other data 111 (transactions) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as a transaction tagging program, hashing module, and security protocols) along with any data needed for the operation of the apparatus and to allow authentication of a user. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for transaction tagging program, hashing module, and security protocols, as wells as other programs. In an embodiment, one or more programs, or aspects of a program, may use AI/ML algorithm(s). The various tasks may be related to tagging transactions using hashes as well as maintain the fidelity of transmitted transactions.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where the user is interacting with an application for remitting payments and statements.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
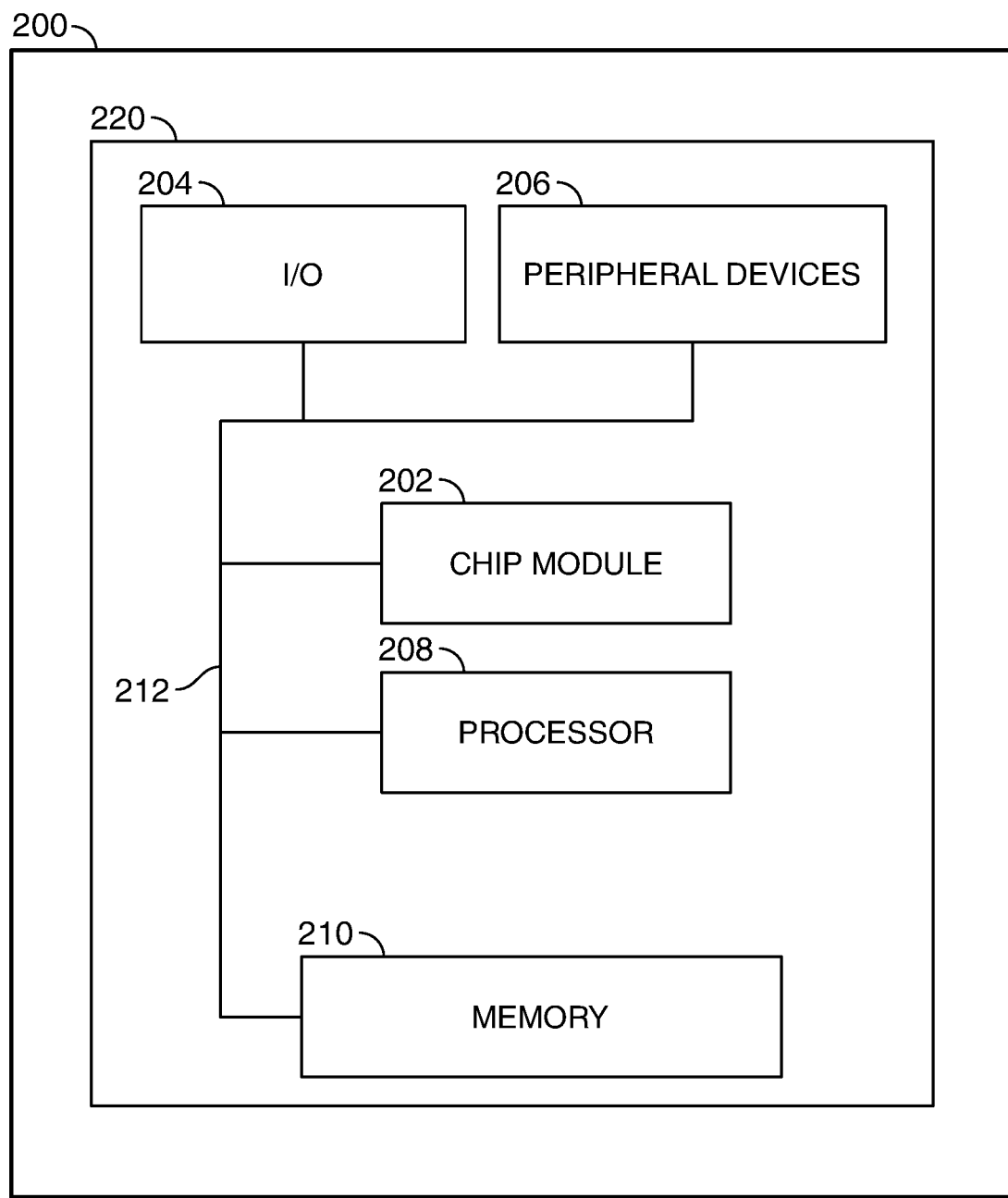
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1, 3, and 6. Apparatus 200 may include chip module 202, which may include one or more integrated circuits, and which may include logic configured to perform any other suitable logical operations.

Apparatus include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
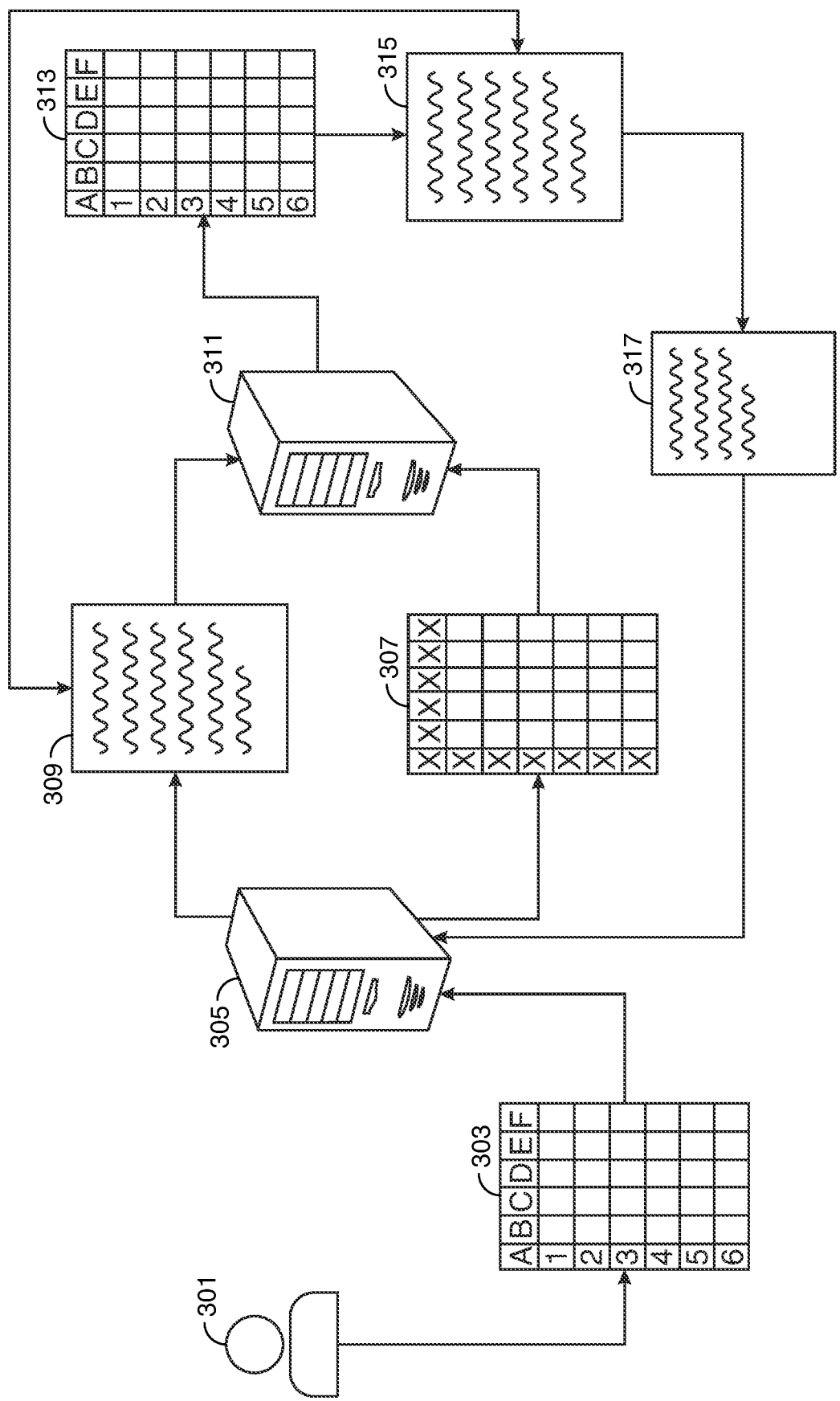
FIG. 3 shows an illustrative schematic in accordance with principles of the disclosure.

FIG. 3 shows an illustrative schematic apparatus in accordance with principles of the disclosure. A user 301 may create or transmit a first transaction log 303 to a sender computer 305. The user 301 may be a person or entity. First transaction log 303 may include first data organized into rows and columns, or otherwise organized. Sender computer 305 may be a personal computer, server, smart mobile device, or other type of computer.

A computer program (not shown) located at sender computer 305 may receive first transaction log 303. The computer 305 may encrypt first transaction log 303 to create an encrypted first transaction log 307. The sender computer 305 may hash the first data within first transaction log 303 to create first hash values 309.

Sender computer 305 may transmit the encrypted transaction log 307 and first hash values 309 to recipient computer 311. Encrypted transaction log 307 and first hash values 309 may be transmitted together or separately. Recipient computer 311 may be a personal computer, server, smart mobile device, or other type of computer.

Recipient computer 311 may decrypt the transmitted transaction log 307 to create a second transaction log 313 which may include second data. If the transmission was perfect, the second data may be identical to the first data. If the transmission was intercepted, changed, corrupted, etc., the second data may be different than the first data. The recipient computer 311 may hash the second data to create second hash values 315.

Second hash values 315 may be compared with first hash values 309. The comparison may take place at the recipient computer, sender computer, or another computer location. If the comparison takes place anywhere other than the recipient computer 311, the first hash values 309 and/or the second hash values 315 may be transmitted to the appropriate location.

The comparison may use any appropriate comparison algorithm, including artificial intelligence/machine learning algorithms. The comparison may generate a report 317. The report 317 may include information as to whether any of the second data is different from the first data, as well as other information (such as metadata). The report 317 may be transmitted to the sender computer 305 as well as elsewhere. In an embodiment, the report 317 may be transmitted to a security program or protocol, as well as a network or security administrator.

Figure 4:
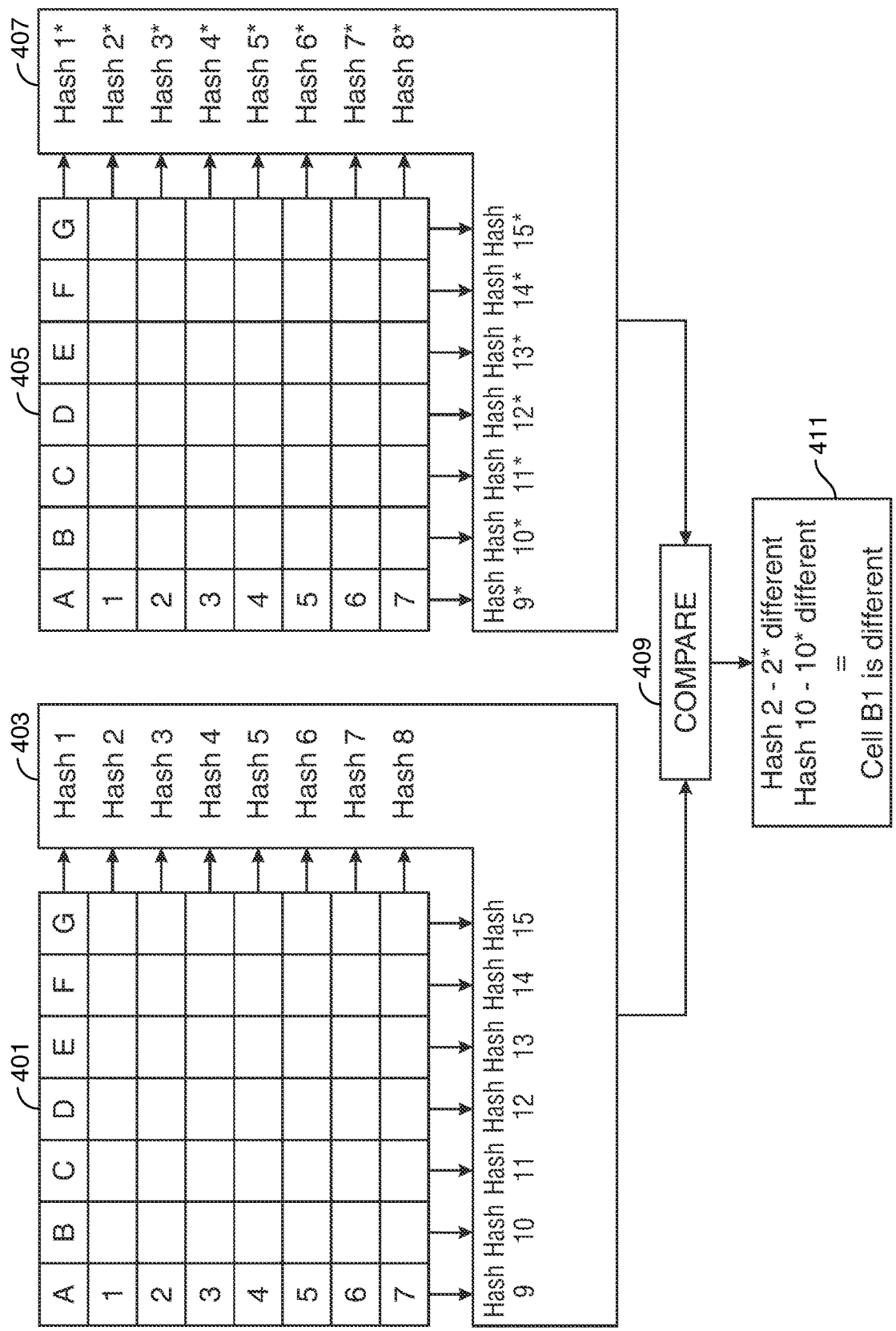
FIG. 4 shows an illustrative schematic in accordance with principles of the disclosure.

FIG. 4 shows an illustrative schematic apparatus in accordance with principles of the disclosure. A first transaction log 401 may include first data divided into various rows and columns. Including the header row and column, the first transaction log shows an exemplary 8 rows and 7 columns, or 56 cells. Each cell may contain similar or unique data.

First hash values 403 may be calculated for each row and column. As shown, first hash values 403 may include an exemplary 15 hashes, named, for convenience, Hash 1 through Hash 15. The first 8 hashes, Hash 1-Hash 8 may be hash values for each row. The second seven hashes, Hash 9-Hash 15 may be hash values for each column. The order may not be important for certain comparison algorithms. Any appropriate hashing algorithm may be used. A more robust and complicated hashing algorithm may be more secure, although it may require more processing power and memory.

A second transaction log 405 may include second data divided into various rows and columns. Including the header row and column, the second transaction log shows an exemplary 8 rows and 7 columns, or 56 cells. Each cell may contain similar or unique data. Ideally, if the transmission of the first transaction log was not intercepted, changed, corrupted etc., the second data should match the first data.

Second hash values 407 may be calculated for each row and column of the second transaction log 405. As shown, second hash values 407 may include an exemplary 15 hashes, named, for convenience, Hash 1* through Hash 15*. The first 8 hashes, Hash 1*-Hash 8* may be hash values for each row of the second transaction log 405. The second seven hashes, Hash 9*-Hash 15* may be hash values for each column of the second transaction log 405. The order may not be important for certain comparison algorithms. Any appropriate hashing algorithm may be used. A more robust and complicated hashing algorithm may be more secure, although it may require more processing power and memory.

A comparison algorithm 409 may compare the first hash values 403 with the second hash values 407. Comparison algorithm 409 may be a part of a larger program, such as a transaction transmission fidelity program.

Comparison algorithm 409, or other program, may generate a report 411. For exemplary and illustrative purposes, report 411 shows that Hash 2 and Hash 2* are different, along with Hash 10 and Hash 10*. After analysis by comparison algorithm 409 or other program, this would indicate that cell B1 in second transaction log 405 is different than cell B1 of first transaction log 401.

Figure 5:
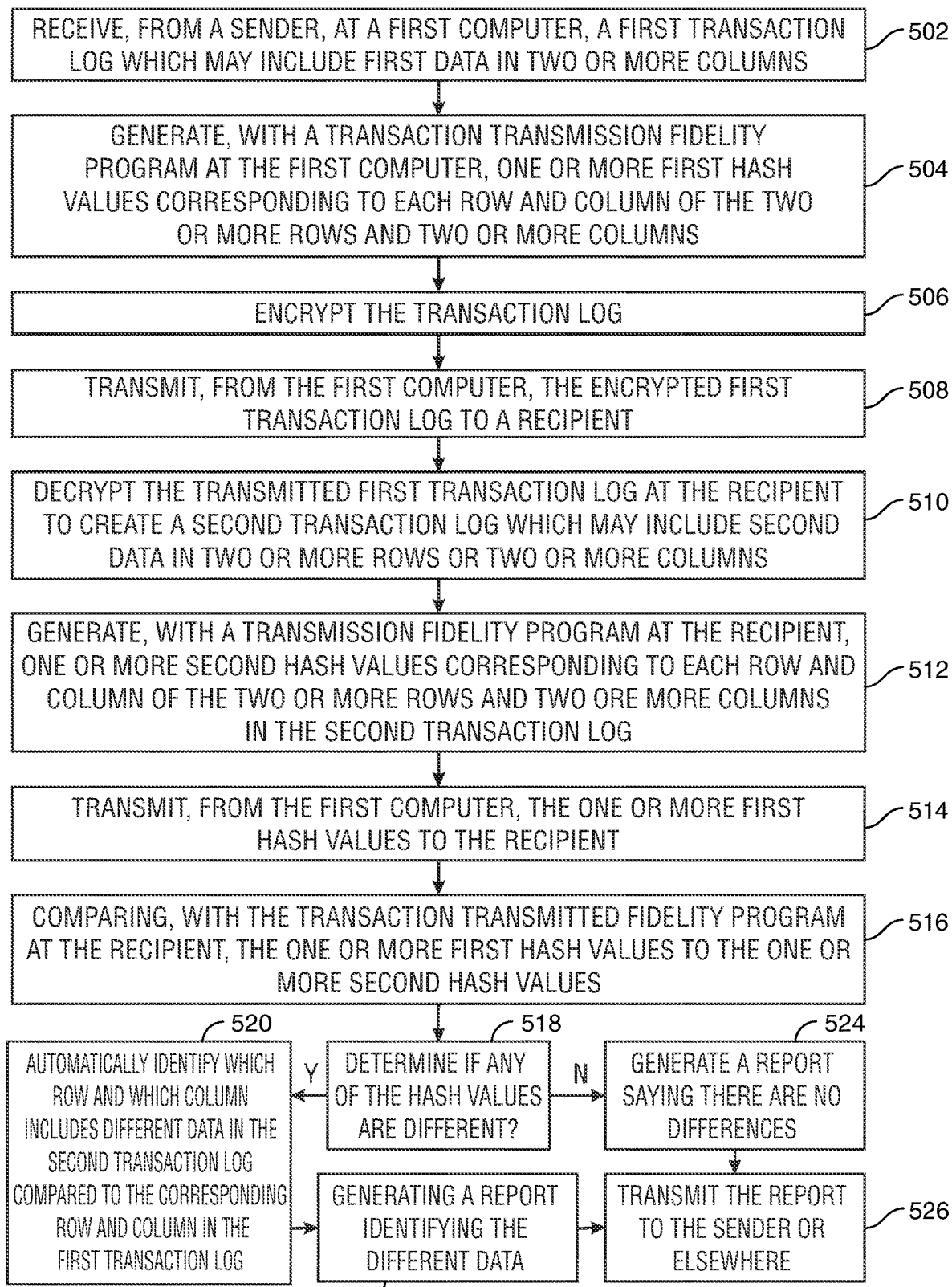
FIG. 5 shows an illustrative flowchart in accordance with principles of the disclosure.

FIG. 5 shows an illustrative flowchart in accordance with principles of the disclosure. Methods may include some or all of the method steps numbered 502 through 526. Methods may include the steps illustrated in FIG. 5 in an order different from the illustrated order. The illustrative method shown in FIG. 5 may include one or more steps performed in other figures or described herein. Steps 502 through 526 may be performed on the apparatus shown in FIGS. 1-4, and 6, or other apparatus.

At step 502, a first computer (which may be referred to as a sender computer) may receive from a sender a first transaction log. The first transaction log may include first data in two or more rows and two or more columns. The first transaction log may be organized in a different format in various embodiments. The first computer may be a server, personal computer, mobile device, or other computer.

At step 504, a transaction transmission fidelity program (or other computer program) located at the first computer may generate, one or more first hash values corresponding to each row and column of the two or more rows and two or more columns.

At step 506, the fidelity program may encrypt the first transaction log. At step 508, the first computer may transmit the encrypted first transaction log to a recipient. The recipient may be located at a second computer.

At step 510, a transaction transmission fidelity program (or other computer program) located at the recipient/second computer may decrypt the transmitted first transaction log to create a second transaction log. The second transaction log may include second data in two or more rows and two or more columns. The second data may be the same as the first data. The second data may be different from the first data. The transaction transmission fidelity program (or other computer program) may be a copy of the program located at the first computer.

At step 512, the transaction transmission fidelity program (or other computer program) may generate one or more second hash values corresponding to each row and column of the two or more rows and two or more columns in the second transaction log. Any appropriate hashing algorithm may be used.

At step 514, the first computer may transmit the one or more first hash values to the recipient/second computer.

At step 516, the transaction transmission fidelity program (or other computer program) at the recipient/second computer may compare the one or more first hash values to the one or more second hash values. In various embodiments, the comparison may take place at the first computer or another computer other than the recipient. This may be done for security or other purposes.

At step 518 the transaction transmission fidelity program (or other computer program) may determine if any of the hash values between the first transaction log and the second transaction log are different than the corresponding hash values. If any are different, at step 520 the transaction transmission fidelity program (or other computer program) may automatically identify which row and which column includes different data in the second transaction log compared to the corresponding row and column in the first transaction log. At step 522, the transaction transmission fidelity program (or other computer program) may generate a report identifying the different data.

If no data is different between the first transaction log and the second transaction log (data or hash values), the transaction transmission fidelity program (or other computer program) may generate a report saying there are no discrepancies at step 524.

At step 526, either report, from sept 522 or step 524 may be transmitted to the sender computer and/or other location.

Figure 6:
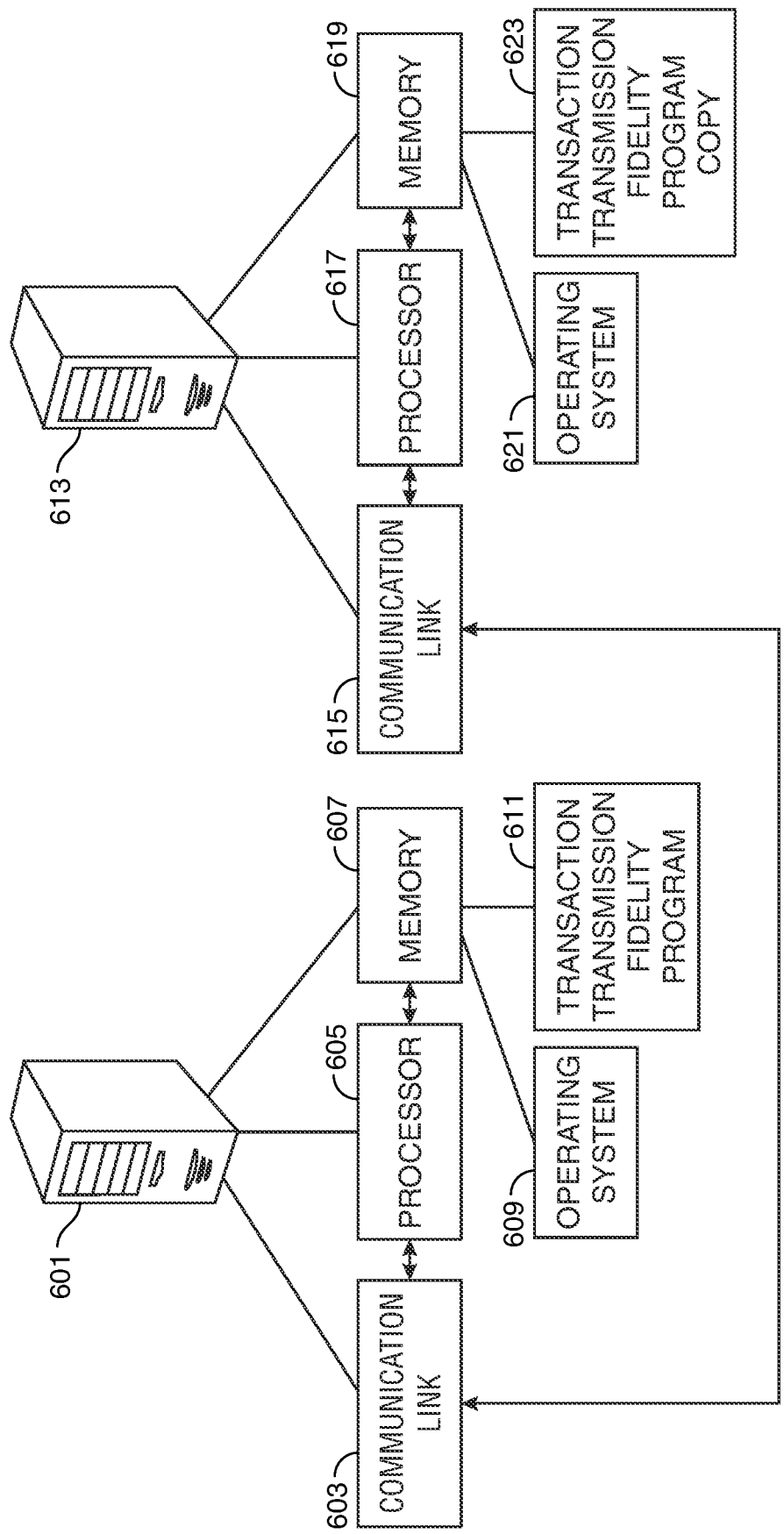
FIG. 6 shows an illustrative apparatus in accordance with principles of the disclosure.

FIG. 6 shows an illustrative apparatus in accordance with principles of the disclosure. A server/sender computer 601 may include a sender communication link 603, a sender processor/processors 605, a sender non-transitory memory 607, as well as other components.

The sender non-transitory memory 607 may include a sender operating system 609, a sender copy of a transaction transmission fidelity program 611, as well as other data and programs.

A server/recipient computer 613 may include a recipient communication link 615, a recipient processor/processors 617, a recipient non-transitory memory 619, as well as other components.

The recipient non-transitory memory 619 may include a recipient operating system 621, a recipient copy of a transaction transmission fidelity program 623, as well as other data and programs.

The sender communication link 603 and recipient communication link 615 may communicate directly with each other. The sender communication link 603 and recipient communication link 615 may communicate indirectly with each other, such as through an external or internal network. An external network may be the Internet. An internal network may be an intranet. An internal network may use Internet protocols.

Sender transaction transmission fidelity program 611 may encrypt a transaction log (not shown) and hash the data within the transaction log. Sender communication link 603 may transmit the encrypted transaction log (as well as the hashes) to the recipient communication link 615. The recipient computer 613 may receive an encrypted transaction log from the sender computer 601.

Thus, apparatus and methods for tagging transactions in transit, hashing the transactions, and identifying mismatches are provided. Persons skilled in the art will appreciate that the present invention can be practiced by other than the described embodiments, which are presented for purposes of illustration rather than of limitation.

What is claimed is:

1. A transaction tagging computer program product, the computer program product comprising executable instructions, the executable instructions, when executed by a processor on a computer system:
   receive, from a first sender, a first transaction log comprising (i) first data comprising two or more transactions in two or more rows and two or more columns and (ii) first metadata;
   generate one or more first hash values corresponding to each row and column of the two or more rows and two or more columns;
   tag each of the two or more transactions with a unique identifier;
   encrypt the first transaction log;
   transmit the encrypted first transaction log, via a computer network, to a recipient;
   decrypt the transmitted first transaction log at the recipient to create a second transaction log comprising second data in two or more rows and two or more columns;
   generate, at the recipient, one or more second hash values corresponding to each row and column of the two or more rows and two or more columns in the second transaction log;
   transmit the first hash values, via a computer network, to the recipient;
   compare, through an artificial intelligence/machine learning algorithm, the first hash values to the second hash values; and
   when one or more of the first hash values are different from any of the corresponding second hash values:
   automatically identify which row and which column comprise different data in the second transaction log compared to the corresponding row and column in the first transaction log;
   generate a report identifying the different data and the unique identifier corresponding to the different data;
   transmit the report to the sender;
   repair the second transaction log with the first data to create a repaired second transaction log, wherein the repaired second transaction log is identical to the first transaction log, except for having second metadata, wherein the second metadata is different from the first metadata; and
   transmit the repaired second transaction log to the sender and a second recipient.

2. The transaction tagging computer program of claim 1 further comprising instructions to transmit the second transaction log to the second recipient.

3. The transaction tagging computer program of claim 1 wherein the first hash values and second hash values are encrypted.

4. The transaction tagging computer program of claim 1 further comprising instructions to tag the first transaction log with the one or more first hash values to create a first tagged transaction log.

5. The transaction tagging computer program of claim 4, further comprising instructions to tag the second transaction log with the one or more second hash values to create a second tagged transaction log.

6. The transaction tagging computer program of claim 5, further comprising instructions to compare, through an artificial intelligence/machine learning algorithm, the first tagged transaction log with the second tagged transaction log.

7. The transaction tagging computer program of claim 1 further comprising instructions to transmit the report to a security entity.

8. The transaction tagging computer program of claim 1, wherein the metadata identifies the repaired second transaction log as the repaired second transaction log.

9. The transaction tagging computer program of claim 1 wherein the second transaction log further comprises metadata.

10. A method for detecting transaction transmission fidelity, the method comprising the steps of:
   a) receiving, from a sender, at a first computer, a first transaction log comprising (i) first data in two or more rows and two or more columns; and (ii) first metadata;
   b) generating, at the first computer, one or more first hash values corresponding to each row and column of the two or more rows and two or more columns;
   c) encrypting, at the first computer, the first transaction log;
   d) transmitting, from the first computer and via a computer network, the encrypted first transaction log to a recipient;
   e) decrypting the transmitted first transaction log at the recipient to create a second transaction log comprising second data in two or more rows and two or more columns;
   f) generating, at the recipient, one or more second hash values corresponding to each row and column of the two or more rows and two or more columns in the second transaction log;
   g) transmitting, from the first computer, the one or more first hash values to the recipient;
   h) comparing, through an artificial intelligence/machine learning algorithm at the recipient, the one or more first hash values to the one or more second hash values; and
   i) when one or more of the one or more first hash values are different than any of the corresponding one or more second hash values:
      automatically identifying which row and which column comprises different data in the second transaction log compared to the corresponding row and column in the first transaction log;
      generating a report identifying the different data;
      transmitting the report to the sender;
      repairing the second transaction log with the first data to create a repaired second transaction log, wherein the repaired second transaction log is identical to the first transaction log, except for having second metadata, wherein the second metadata is different from the first metadata; and
      transmitting the repaired second transaction log to the sender and a second recipient.

11. The method of claim 10 wherein the recipient is a second computer.

12. The method of claim 10 further comprising repeating the steps of d) through i) for additional recipients.

13. The method of claim 10 further comprising transmitting the report to a security protocol.

14. The method of claim 10, wherein the metadata identifies the repaired second transaction log as the repaired second transaction log.

15. The method of claim 14, wherein the second transaction log further comprises third metadata.

16. The method of claim 15 wherein the step of i) further comprises analyzing the different data, the first metadata, and the second metadata, with one or more machine learning algorithms to determine whether the different data is the result of:
   1) data corruption;
   2) malicious activity;
   3) user mistake; or
   4) a combination of 1)-3).

17. An apparatus for detecting transaction transmission fidelity, the apparatus comprising:
   a sender computer, the sender computer comprising:
      a sender communication link;
      a sender processor; and
      a sender non-transitory memory configured to store executable data configured to run on the sender processor comprising:
         a sender operating system; and
         a sender copy of a transaction transmission fidelity program; and
   a recipient computer, the recipient computer comprising:
      a recipient communication link;
      a recipient processor; and
      a recipient non-transitory memory configured to store executable data configured to run on the recipient processor comprising:
         a recipient operating system; and
   a recipient copy of the transaction transmission fidelity program; wherein:
   the sender computer receives a first transaction log comprising (i) two or more transactions in two or more rows and two or more columns and (ii) first metadata;
   the sender copy of the transaction transmission fidelity program:
      tags each of the two or more transactions with a unique identifier;
      generates one or more first hash values corresponding to each row and column of the two or more rows and two or more columns;
      encrypts the first transaction log;
      transmits, via a computer network, the first hash values to the recipient computer;
      transmits, via a computer network, the unique identifiers to the recipient computer; and
      transmits, via a computer network, the encrypted first transaction log to the recipient computer;
   and
   the recipient copy of the transaction transmission fidelity program:
      receives the first hash values, the unique identifiers, and the encrypted first transaction log;
      decrypts the transmitted first transaction log to create a second transaction log comprising second data in two or more rows and two or more columns;
      generates one or more second hash values corresponding to each row and column of the two or more rows and two or more columns in the second transaction log;
      compares, through an artificial intelligence/machine learning algorithm, the first hash values to the second hash values; and
      when one or more of the first hash values are different from any of the corresponding second hash values:
         automatically identifies which row and which column comprise different data in the second transaction log compared to the corresponding row and column in the first transaction log;

identifies, through the unique identifiers, which transaction is different in the second transaction log;

generates a report identifying the different data and different transaction;

transmits the report to the sender computer;

repairs the second transaction log with the first transaction log to create a repaired second transaction log, wherein the repaired second transaction log is identical to the first transaction log, except for having second metadata, wherein the second metadata is different from the first metadata; and transmits the repaired second transaction log to the sender and a second recipient.

18. The apparatus of claim 17 wherein one or both of the sender computer and the recipient computer is a server.

\* \* \* \* \*